Patented Oct. 9, 1945

2,386,661

UNITED STATES PATENT OFFICE 2,386,661

IMPROVED BUTADIENE-ACRYLONITRILE COPOLYMERS

Albert M. Clifford, Stow, and William D. Wolfe, Cuyahoga Falls, Ohio, assignors to Wingfoot Corporation, Akron, Ohio, a corporation of Delaware No Drawing. Application May 22, 1942,
Serial No. 444,092

1 Claim. (Cl. 260—84.5)

This invention relates to copolymers of improved physical characteristics which are formed from three different monomers.

A very successful type of synthetic rubber is that made by the interpolymerization of butadiene and acrylonitrile, the rubber usually being prepared in an aqueous emulsion. This quite generally known type of product resembles pale crepe rubber in appearance but differs from it in physical properties. Is is extremely tough as compared with rubber and is difficult to manipulate on a rubber mill in order to incorporate therein the compounding ingredients necessary to form a useful cured rubber. Even prolonged milling has little effect on its plasticity so that the attainment of a smooth sheet is practically impossible. It has been recognized that if the properties of synthetic rubbers of this type could be improved, the difficulty and expense of making articles therefrom would be greatly reduced.

It has now been found that the workability of butadiene-acrylonitrile type copolymers can be improved by incorporating in the mixture of monomers, to be subjected to polymerizing conditions, a quantity of an ester of alpha-substituted acrylic acid. Methyl methacrylate is the preferred modifier. The ester is added in monomeric form and therefore is interpolymerized with the other two monomers of the mixture. Interpolymers prepared from the three constituents are found to be not only more workable, being smoother and less grainy when worked, but also to yield vulcanizates of better quality than the copolymers prepared from the two monomers alone.

The process of polymerization is advantageously conducted in an emulsion, particularly an aqueous emulsion, so that the interpolymer is obtained as a coagulable latex. The ingredients ordinarily employed in such emulsification polymerization are used, such as an emulsifying agent (for instance, sodium lauryl sulfate, sodium oleate and the like) and an oxidant (such as sodium perborate, hydrogen peroxide, etc.). The details of the emulsion polymerization are known in the art, being those employed in the manufacture of the two-component butadiene-acrylonitrile copolymers. However, it may be said that agitation will be employed, and a temperature from 30 to 80° C. will ordinarily prevail during the reaction. A preferred temperature range is in the neighborhood of 38-50° C.

The acrylates which may be added for their modifying effect on the interpolymer include the itaconates which are alpha substituted acrylates having the formula

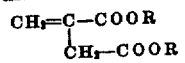

where R is a hydrocarbon substituent such as ethyl, butyl, etc., and also n-butyl methacrylate, benzyl methacrylate, cyclohexyl methacrylate, allyl methacrylate, terpinyl methacrylate, the corresponding ethacrylates, chlor acrylates, such as allyl alpha chloracrylate, etc.

The amount of the modifying acrylate ester which is added may vary from about 1% to 5% on the total monomer previously present in the reaction mixture, or as much as 10% may be used.

The ratio of the butadiene and acrylonitrile may be varied in the usual proportion, such as, for example, 75 to 25, 70 to 30, 60 to 40, etc. Copolymers of this type are well-known in the art.

The butadiene-acrylonitrile type copolymer may be formed from butadiene-1,3 and acrylonitrile, butadiene-1,3 and methacrylonitrile, isoprene and acrylonitrile, isoprene and methacrylonitrile and other suitable homologues of butadiene and acrylonitrile.

The copolymers may, for example, be prepared according to the following formula:

| | | |
|---|---|---|
| Butadiene | pounds | 6.0 |
| Acrylonitrile | do | 2.0 |
| Methyl methacrylate | | X |
| Water | lbs | 10.0 |
| Sodium lauryl sulfate | grams | 226.0 |
| Acetic acid | do | 17.0 |
| NaH$_2$PO$_4$ (anhydrous) | do | 40.7 |
| NaBO$_3$ | do | 60.0 |
| Carbon tetrachloride | do | 102.0 |
| KCN | do | 4.26 |
| Acetaldehyde | c.c. | 11.6 |

The reaction vessel was evacuated and flushed with nitrogen, and the reaction was carried out at between 35 and 40° C. In three different experiments the amount of methyl methacrylate employed was 0.8 pound, .16 and .4 pound being 1, 2 and 5% respectively.

The latex thus produced may be coagulated with any usual coagulating medium, such as alcohol or barium chloride, etc.

The following table compares tests conducted under identical conditions on samples which are entirely comparable except that they contain different amounts of the methacrylate. The ratio of butadiene to acrylonitrile was 75:25 in all the test materials. The test results show that a copolymer having improved properties is obtained.

| Percent methyl methacrylate | Tensile strength | Percent elongation |
|---|---|---|
| None | 252 | 535 |
| 1 | 276 | 760 |
| 2 | 318 | 700 |
| 3 | 302 | 650 |

What we claim is:

A rubber-like copolymer containing in interpolymerized relation about 60 to 75 parts of butadiene-1,3, about 40 to 25 parts of acrylonitrile and about 1% to 3% of the total weight of butadiene and acrylonitrile of methyl methacrylate, said copolymer being more workable than the same copolymer prepared without the addition of acrylate.

ALBERT M. CLIFFORD.
WILLIAM D. WOLFE.

CERTIFICATE OF CORRECTION.

Patent No. 2,386,661.                                           October 9, 1945.

ALBERT M. CLIFFORD, ET AL.

It is hereby certified that error appears in the printed specification of the above numbered patent requiring correction as follows: Page 1, second column, line 45, for "0.8" read --.08--; and that the said Letters Patent should be read with this correction therein that the same may conform to the record of the case in the Patent Office.

Signed and sealed this 15th day of January, A. D. 1946.

Leslie Frazer

(Seal)                  First Assistant Commissioner of Patents.

a copolymer having improved properties is obtained.

| Percent methyl methacrylate | Tensile strength | Percent elongation |
|---|---|---|
| None | 252 | 535 |
| 1 | 276 | 760 |
| 2 | 318 | 700 |
| 3 | 302 | 650 |

What we claim is:

A rubber-like copolymer containing in interpolymerized relation about 60 to 75 parts of butadiene-1,3, about 40 to 25 parts of acrylonitrile and about 1% to 3% of the total weight of butadiene and acrylonitrile of methyl methacrylate, said copolymer being more workable than the same copolymer prepared without the addition of acrylate.

ALBERT M. CLIFFORD.
WILLIAM D. WOLFE.

CERTIFICATE OF CORRECTION.

Patent No. 2,386,661.    October 9, 1945.

ALBERT M. CLIFFORD, ET AL.

It is hereby certified that error appears in the printed specification of the above numbered patent requiring correction as follows: Page 1, second column, line 45, for "0.8" read --.08--; and that the said Letters Patent should be read with this correction therein that the same may conform to the record of the case in the Patent Office.

Signed and sealed this 15th day of January, A. D. 1946.

Leslie Frazer (Seal)    First Assistant Commissioner of Patents.